United States Patent [19]
Kroenke

[11] 3,914,201
[45] Oct. 21, 1975

[54] FLAME AND SMOKE RETARDANT VINYL CHLORIDE AND VINYLIDENE CHLORIDE POLYMER COMPOSITIONS
[75] Inventor: William J. Kroenke, Brecksville, Ohio
[73] Assignee: The B. F. Goodrich Company, Akron, Ohio
[22] Filed: June 24, 1974
[21] Appl. No.: 482,483

Related U.S. Application Data
[62] Division of Ser. No. 438,759, Feb. 1, 1974.

[52] U.S. Cl.... 260/45.75 R; 260/42.24; 260/45.9 R
[51] Int. Cl.² .......................................... C08F 6/00
[58] Field of Search...... 260/45.75 R, 42.24, 45.9 R

[56] References Cited
UNITED STATES PATENTS
3,821,151  6/1974  Mitchell.......................... 260/45.75

OTHER PUBLICATIONS
CA – Vol. 75, 1971, p. 27, Citation No. 110,978f.

Primary Examiner—V. P. Hoke
Attorney, Agent, or Firm—J. Hughes Powell, Jr.

[57] ABSTRACT

Flame and smoke retardant vinyl chloride and vinylidene chloride polymer compositions are obtained by including therein a compound selected from the group consisting of $Si_3N_4$, $MoS_2$ and mixtures thereof.

5 Claims, No Drawings

FLAME AND SMOKE RETARDANT VINYL CHLORIDE AND VINYLIDENE CHLORIDE POLYMER COMPOSITIONS

This is a division of application Ser. No. 438,759 filed Feb. 1, 1974.

BACKGROUND OF THE INVENTION

Vinyl chloride and vinylidene chloride polymers are known to be self-extinguishing and relatively more flame retardant than other polymers such as polyethylene, polypropylene and the like. However, smoke may be produced upon exposure of vinyl chloride and vinylidene chloride polymers to a flame. In addition, improved flame retardancy of these polymers may be desired for applications such as aircraft interiors and the like. Conventional flame retardants such as antimony oxide do not aid in smoke reduction. New vinyl chloride and vinylidene chloride polymer compositions are desired which are capable of both flame retardation and smoke reduction.

SUMMARY OF THE INVENTION

Flame and smoke retardant vinyl chloride and vinylidene chloride polymer compositions are obtained by including therein a compound selected from the group consisting of $Si_3N_4$, $MoS_2$ and mixtures thereof.

DETAILED DESCRIPTION

Vinyl chloride and vinylidene chloride polymers used in this invention include homopolymers, copolymers and blends of homopolymers and/or copolymers. The vinyl chloride and vinylidene chloride polymers may contain from 0 up to about 50% by weight of at least one other vinylidene monomer (i.e., a monomer containing at least one terminal $CH_2=C<$ group per molecule) copolymerized therewith, more preferably up to about 20% by weight of such monomer. These monomers include 1 — olefins having from 2 to 12 carbon atoms, more preferably from 2 to 8 carbon atoms, such as ethylene, propylene, 1-butene, isobutylene, 1-hexene, 4-methyl-l-pentene and the like; dienes having from 4 to 10 carbon atoms including such conjugated dienes as butadiene, isoprene, piperylene and the like; ethylidene norbornene and dicyclopentadiene; vinyl esters and allyl esters such as vinyl acetate, vinyl chloroacetate, vinyl propionate, vinyl laurate, allyl acetate and the like; vinyl aromatics such as styrene, α-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α-, β- and γ-cyanopropyl acrylates and the like; olefinically unsaturated carboxylic acids and esters thereof, including α, β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate and the like, and including esters of maleic and fumaric acid and the like; amides of the α, β-olefinically unsaturated carboxylic acids such as acrylamide and the like; divinyls, diacrylates and other polyfunctional monomers such as divinyl benzene, divinyl ether, diethylene glycol diacrylate, ethylene glycol dimethacrylate, methylene bis-acrylamide, allyl pentaerythritol, and the like; bis(β-haloalkyl) alkenyl phosphonates such as bis(β-chlorethyl)vinyl phosphonate and the like; and the like.

More preferred monomers include 1-olefins having from 2 to 12 carbon atoms, more preferably from 2 to 8 carbon atoms, such as ethylene, propylene, 1-butene, isobutylene, 1-hexene, 4-methyl-l-pentene and the like; vinyl esters and allyl esters such as vinyl acetate, vinyl chloroacetate, vinyl propionate, vinyl laurate, allyl acetate and the like; olefinically unsaturated carboxylic acids and esters thereof, including α, β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioacrylate, methyl methacrylate, ethyl methacrylate, butyl methacrylate, glycidyl methacrylate and the like, and including esters of maleic and fumaric acid and the like; and amides of α, β-olefinically unsaturated carboxylic acids such as acrylamide and the like.

The $Si_3N_4$ or $MoS_2$ additive compounds or mixtures thereof used in this invention are polycrystalline or amorphous materials having an average particle size from about 100 microns to about 0.5 micron, more preferably from about 40 microns to about 0.5 micron. Acicular single crystals ("whiskers") are not desired because they disperse less readily and are substantially more expensive. The additives used in this invention are all colored compounds. Polymer compositions containing them may have colors similar to, although somewhat lighter than, the compounds themselves.

The additive compounds are used in amounts from about 0.5 weight parts to about 10 weight parts per 100 weight parts of polymer. The amount used may be varied to obtain a proper balance of flame retardancy and smoke retardancy. Use of more than about 10 parts by weight of additive per 100 parts by weight of polymer probably will affect adversely other important physical properties, such as tensile strength and the like.

The vinyl chloride and vinylidene chloride polymers may be prepared by any method known to the art such as by emulsion, suspension, bulk or solution polymerization. The additive compounds may be mixed with the polymer emulsion, suspension, solution or bulk mass before monomer recovery and/or drying. More preferably the compounds may be mixed with dry granular or powdered vinyl chloride or vinylidene chloride polymers. The polymer and compound may be mixed thoroughly in granular or powder form in apparatus such as a Henschel mixer and the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer composition and level of additive compound but will generally be in the range of about 300° to 400°F and 2 to 10 minutes.

Flame and smoke retardancy may be measured using the Goodrich Smoke - OI Test. The test results correlate well to the Oxygen Index (ASTM D2863-70). The test results also correlate to NBS Smoke Chamber date (ASTM STP 422, pp. 166–204) over the full NBS Smoke Chamber test range. Generally ¼ × 6 × 0.075 in. strips for plasticized polymers. The Goodrich - OI testing is performed in a standard Oxygen Index test chamber (described in ASTM D2863-70) modified to permit the smoke from the burning sample to rise in the vertical chimney and pass through the light beam of an integrating spectrophotometer. The integrated area provides a measure of the amount of smoke generated by a burning sample.

Mass loss rate (m = grams/minute) for the Goodrich Smoke - OI Test are determined at five or more different oxygen concentrations and plotted against these concentrations. Linear regression analysis is used to find the mass loss rate curve that best fits the data; correlation coefficients are at least 0.90 and generally about 0.95. The Goodrich OI number is the % oxygen concentration at which $m = 0.3$ grams/minute. Successive tests of a given composition have a reproducibility of about ± 1% oxygen. A Goodrich smoke number ($D' = 1$/cm) is calculated using the formula $$D' = \frac{\text{rate of smoke production (grams/min–cm)}}{\text{mass loss rate (grams/min.)}}$$

for the point on the mass loss rate curve where $m$ is a constant (0.6 grams/min.). Suitable flame and smoke retardant compositions have substantially higher Goodrich OI numbers and lower Goodrich smoke numbers than control samples.

Smoke retardancy and char enhancement may be measured quickly using the Goodrich Smoke-Char Test. Small (0.3–0.4g) polymer samples measuring about ½ × ⅝ × 0.075 in. are placed on a screen and burned with a propane gas flame rising vertically from beneath the sample. Sample geometry at a constant weight has been found not to be significant for the small samples used in this test. A Bernz-O-Matic pencil flame burner head is used with gas pressure maintained at 40 psig. The sample is immersed totally and continuously in the flame. Smoke from the burning sample rises in a vertical chimney and passes through the light beam of a Model 407 Precision Wideband Photometer (Grace Electronics, Inc., Clevland, Ohio) coupled with a Newport Photometer integrator. Other integrating spectrophotometers also may be used. The smoke number, $S_{pvc}$, is a measurement of smoke generation as integrated area per gram of polymer in the sample compound.

The residue or "char" remaining after the Goodrich Smoke-Char Test is weighed and used to calculate the "percent of backbone char" (% BC), which takes into account nonburnable residues identified, for example, by X-ray diffraction analysis. % BC is, therefore, a measurement of polymer resistance to burning. Increased char after burning indicates increased flame resistance. The following formula is used to calculate percent of backbone char from the indicated variable weights:

$$\% BC = \frac{\text{actual char} - \text{expected nonburnable residues}}{\text{compound wt.} - \text{nonPVC ingredients} - \text{HCl content of PVC}} \times 100$$

where "PVC" is used to designate vinyl chloride and vinylidene chloride polymers.

The vinyl chloride and vinylidene chloride polymer compositions of this invention may contain the usual compounding ingredients known to the art such as fillers, stabilizers, opacifiers, lubricants, processing aids, impact modifying resins, plasticizers, antioxidants and the like.

The improved flame and smoke retardant vinyl chloride and vinylidene chloride compositions of this invention are useful wherever flame and smoke resistance are desirable, such as in plastic components for airplane interiors, children's toys, house siding and the like. Of course, overall suitability for a particular use will depend upon other factors as well, such as comonomer type and level, compounding ingredient type and level, polymer particle size, etc.

The following examples illustrate the present invention more fully.

EXAMPLE 1

The following recipe was used:

| MATERIAL | PARTS |
| --- | --- |
| Polyvinyl Chloride (1) | 100 |
| Polyethylene Powder Processing Aid | 2 |
| Dibutyl tin bis(isooctylthioglycollate)stabilizer | 2 |
| $Si_3N_4$ or $MoS_2$ (2) | 10 |
| | 114 |

(1) Homopolymer having an inherent viscosity of about 0.94 – 0.99; ASTM classification GP-4-15443.
(2) The control sample contained neither $Si_3N_4$ nor $MoS_2$.

Each experimetnal sample was prepared by blending the above materials using an Osterizer blender. Thd dibutyl tin bis (isooctylthioglycollate) was added in four 0.5g portions to the other materials with 15 second intervals between each addition. The samples were then milled on a two-roll mill for about 3 minutes at a roll surface temperature of about 320°F. The milled samples were pressed into 6 × 6 in. × 0.075 in. sheets at about 330°F. using 40,000 lbs. of force applied to a 4 in. ram. The samples were given a 3-minute preheat prior to pressing for 6 minutes under full load.

The molded samples were cut into ¼ × 6 × 0.075 in. strips and tested using the Oxygen Index (ASTM D2863-70) and Goodrich Smoke - OI tests described heretofore. Test results are given in Table I:

TABLE I

| Additive | Oxygen Index | Goodrich OI* | Goodrich D'(1/cm)** | Goodrich D' as % of Control |
| --- | --- | --- | --- | --- |
| None (Control) | 43 | 45 | 414 | — |
| $Si_3N_4$ | 55 | 59 | 182 | 44 |
| $MoS_2$ | 57 | 57 | 149 | 36 |

*OI at m = 0.3g/min.
**D' at m = 0.6g/min.

These results demonstrate that $Si_3N_4$ and $MoS_2$ substantially retard flame and smoke during burning of rigid polyvinyl chloride in the oxygen-enriched atmosphere used for the ASTM D2863-70 Oxygen Index and Goodrich Smoke - OI tests.

EXAMPLE 2

The following recipe was used:

| MATERIAL | PARTS |
| --- | --- |
| Polyvinyl Chloride (1) | 100 |
| Polyethylene Powder Processing Aid | 2 |
| Dibutyl tin bis(isooctylthioglycollate)stabilizer | 2 |
| $Si_3N_4$ or $MoS_2$ (2) | Variable |

(1) Homopolymer having an inherent viscosity of about 0.94 – 0.99; ASTM Classification GP-4-15443.
(2) The control sample contained neither $Si_3N_4$ nor $MoS_2$.

Each experimental sample was prepared by blending the above materials using an Osterizer blender. The dibutyl tin bis (isocctylthioglycollate) was added in four 0.5 g portions to the other materials, with 15 second intervals between each addition. The samples were then milled on a two-roll mill for about 3 minutes at a roll surface temperature of about 320°F. The milled samples were pressed into 6 × 6 × 0.075 in. sheets at about 330°F using 40,000 lbs. of force applied to a 4-inch ram. The samples were given a 3-minute preheat prior to pressing for 6 minutes under full load.

The molded samples were cut into 0.3 – 0.4 gram samples (about ½ × ⅜ × 0.075 in.) and tested using the Goodrich Smoke-Char test described heretofore. Test results are given in Table II:

TABLE II

| Additive Type | PHR* | Smoke Formation $S_{pvc}$** | Reduction | Char Formation %BC*** | % Increase |
| --- | --- | --- | --- | --- | --- |
| None | — | 112 | — | 2.72 | — |
| $Si_3N_4$ | 10 | 75 | 33 | 12.33 | 350 |
| $MoS_2$ | 1 | 109 | 3 | 8.86 | 226 |
| $MoS_2$ | 10 | 83 | 26 | 23.39 | 760 |

*Weight Parts of additive per 100 weight parts of polyvinyl chloride.
**Lower $S_{pvc}$ indicates less smoke formation.
***% Backbone Char discussed heretofore at pp. 6–7.

These results demonstrate that $Si_3N_4$ and $MoS_2$ at 10 part levels substantially reduce smoke evolution and enhance char formation during forced burning of rigid polyvinyl chloride in the Goodrich Smoke-Char test. A 1 part level of $MoS_2$ is substantially less effective in smoke reduction but still enhances char formation.

I claim:

1. A flame and smoke retardant composition comprising (1) a vinyl chloride or vinylidene chloride polymer and (2) a mixture of $MoS_2$ and $Si_3N_4$, said mixture being presnet in an amount from about 0.5 to about 10 weight parts per 100 weight parts of polymer and having an average particle size from about 100 microns to about 0.5 micron.

2. A composition of claim 1 wherein said polymer contains copolymerized therewith up to about 50% by weight of at least one other vinylidene monomer containing at least one terminal $CH_2=C<$ group per molecule.

3. A composition of claim 2 wherein said polymer contains copolymerized therewith up to about 20% by weight of said other vinylidene monomer.

4. A composition of claim 3 wherein said vinylidene monomer is selected from the group consisting of 1-olefins having from 2 to 12 carbon atoms, vinyl esters, $\alpha,\beta$-olefinically unsaturated carboxylic acids and esters thereof, amides of $\alpha,\beta$-olefinically unsaturated carboxylic acids, and esters of fumaric and maleic acid.

5. A composition of claim 4 wherein said compound has an average particle size of from about 40 microns to about 0.5 micron.

* * * * *

UNITED STATES PATENT OFFICE
CERTIFICATE OF CORRECTION

PATENT NO. : 3,914,201
DATED : October 21, 1975
INVENTOR(S) : William J. Kroenke It is certified that error appears in the above-identified patent and that said Letters Patent are hereby corrected as shown below:

Column 3, line 1, "date" should read ---data---; line 4, after in. insert ---strips are used for testing rigid polymers and 1/8 in. x 6 in. x 1/4 in.---. Column 4, line 35, "Thd" should read ---The---. Column 5, line 16, "(isocctylthioglycollate)" should read ---isooctylthioglycollate---. In Table II in column 5, under Smoke Formation should be ---% Reduction---. Column 6, line 16 "presnet" should read ---present---.

Signed and Sealed this twenty-seventh Day of April 1976

[SEAL]

Attest:

RUTH C. MASON
Attesting Officer

C. MARSHALL DANN
Commissioner of Patents and Trademarks